US006746792B2

(12) United States Patent
Hasegawa et al.

(10) Patent No.: US 6,746,792 B2
(45) Date of Patent: Jun. 8, 2004

(54) FUEL CELL SEPARATOR COMPOSITION, FUEL CELL SEPARATOR AND METHOD OF MANUFACTURE, AND SOLID POLYMER FUEL CELL

(75) Inventors: Shun Hasegawa, Chiba (JP); Gen Masuda, Chiba (JP); Yukiko Yano, Chiba (JP); Kazuo Saito, Chiba (JP); Atsushi Hagiwara, Chiba (JP)

(73) Assignee: Nisshinbo Industries, Inc., Tokyo (JP)

( * ) Notice: Subject to any disclaimer, the term of this patent is extended or adjusted under 35 U.S.C. 154(b) by 158 days.

(21) Appl. No.: 10/085,105

(22) Filed: Mar. 1, 2002

(65) Prior Publication Data

US 2002/0164516 A1 Nov. 7, 2002

(30) Foreign Application Priority Data

Mar. 2, 2001 (JP) ........................................ 2001-057587

(51) Int. Cl.$^7$ .......................... H01M 2/00; H01M 8/10; H01B 1/06; B29C 69/00
(52) U.S. Cl. ............................ 429/34; 429/32; 429/38; 252/511; 264/241
(58) Field of Search ................. 429/34, 38, 32, 429/30, 39; 252/511, 510; 264/104, 105, 241

(56) References Cited

U.S. PATENT DOCUMENTS 6,242,124 B1 * 6/2001 Saito et al. .................... 429/38

FOREIGN PATENT DOCUMENTS

| JP | 56-116277 | | 9/1981 | |
| JP | 59-26907 | | 2/1984 | |
| JP | 11-256009 | * | 9/1999 | ........... C08L/61/34 |

* cited by examiner

*Primary Examiner*—Stephen Kalafut
(74) *Attorney, Agent, or Firm*—Birch, Stewart, Kolasch & Birch, LLP

(57) ABSTRACT

A fuel cell separator composition containing an electrically conductive carbonaceous powder and a binder that is a mixture of a thermoset resin with a polyoxazine compound having a plurality of oxazine rings can be used to efficiently mass-produce high-modulus fuel cell separators of excellent dimensional stability and gas impermeability. By employing such fuel cell separators as some or all of the separators in a solid polymer fuel cell, there can be obtained solid polymer fuel cells which are not subject to cracking or breakage during assembly, have good gas sealing properties, and are endowed with excellent vibration and impact resistance.

9 Claims, 2 Drawing Sheets

FUEL CELL SEPARATOR COMPOSITION, FUEL CELL SEPARATOR AND METHOD OF MANUFACTURE, AND SOLID POLYMER FUEL CELL

BACKGROUND OF THE INVENTION

1. Field of the Invention

The present invention relates to fuel cell separator compositions and to fuel cell separators made therewith as well as a method of manufacturing such fuel cell separators. The invention also relates to a solid polymer fuel cell assembled using such fuel cell separators as some or all of the separators therein.

2. Prior Art

Fuel cells are devices which convert chemical energy directly into electrical energy by placing a pair of electrodes in mutual contact through an intervening electrolyte, feeding a fuel to one of the electrodes and an oxidant to the other electrode, and carrying out oxidation of the fuel electrochemically within the cell. There are several types of fuel cells, depending on the electrolyte used. Solid polymer fuel cells in which the electrolyte is a solid polymer electrolyte membrane have attracted considerable attention recently for their ability to achieve a high energy output.

As shown in FIG. 1, such solid polymer fuel cells are composed of a stack of from several tens to several hundreds of unit cells, each unit cell having a pair of fuel cell separators 1, 1 with a plurality of ribs 1a on either side thereof, between which separators 1 are disposed a solid polymer electrolyte membrane, 2 and a pair of gas diffusing electrodes (a fuel electrode and an oxidant electrode) 3, 3.

In the illustrated solid polymer fuel cell, a stream of hydrogen is supplied to the fuel electrode, a stream of oxygen is supplied to the oxidant electrode, and the electrical current produced by the cell is drawn off by an external circuit. The reactions which take place at the respective electrodes can be represented as follows.

Fuel electrode reaction: 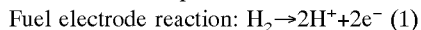 $H_2 \rightarrow 2H^+ + 2e^-$ (1)

Oxidant electrode reaction: 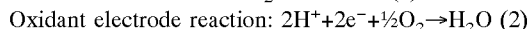 $2H^+ + 2e^- + \frac{1}{2}O_2 \rightarrow H_2O$ (2)

Overall reaction: 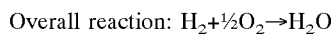 $H_2 + \frac{1}{2}O_2 \rightarrow H_2O$

That is, hydrogen ($H_2$) is converted into protons ($H^+$) at the fuel electrode. The protons then migrate through the solid polymer electrolyte membrane to the oxidant electrode, where they react with oxygen ($O_2$) to form water ($H_2O$). The supply and removal of reactant and product gases and the drawing off of electrical current are thus essential to operation of the solid polymer fuel cell. Moreover, it is presumed that the solid polymer fuel cell will generally be operated in a wet environment within a temperature range of room temperature to 120° C., meaning that water will be handled in a liquid state. Arrangements must therefore be made to control the supply of water to the fuel electrode and to remove water from the oxidant electrode.

Of the components making up this type of fuel cell, the fuel cell separator, as shown in FIGS. 2A and 2B, has the distinctive shape of a thin plate provided on one or both sides thereof with a plurality of flow channels 4 for the supply and removal of gases. It plays several important roles, one of which is to separate the fuel gas, oxidant gas, and cooling water flowing through the fuel cell to keep them from mingling. In addition, it transmits from the fuel cell electrical energy generated within the cell, and dissipates out of the fuel cell heat that forms within the cell. Accordingly, a need has been strongly felt for fuel cell separators which, in addition to gas barrier properties, electrical conductivity and corrosion resistance, also have sufficient mechanical strength to resist cracking and breaking of the separators from the tightening of bolts and nuts during fuel cell assembly, and which moreover are endowed with excellent vibration and impact resistance when the fuel cell is used as a mobile power supply for automotive and other similar applications.

Carbon composites in which various thermoplastic or thermoset resins offering certain advantages in terms of ease of production and cost are employed as binders have already been proposed for use in solid polymer fuel cell separators of this type. Examples include carbon composites in which the following are used as the binder: the phenolic and other thermoset resins described in JP-A 59-26907; and the polypropylene, nylon and other thermoplastic resins described in JP-A 56-116277.

However, fuel cell separators made of carbon composites in which such thermoplastic or thermoset resins are used as the binder, while preferable from the standpoint of production and cost to the separators machined from graphite sheets that were previously used, leave much to be desired in terms of such performance characteristics as mechanical strength, chemical resistance, gas permeability, and dimensional stability. An additional drawback is the need for degassing during the separator molding or forming operation.

SUMMARY OF THE INVENTION

It is therefore one object of the invention to provide a fuel cell separator composition from which there can be obtained a fuel cell separator that is capable of being mass-produced and has excellent electrical conductivity, mechanical strength, chemical resistance, gas impermeability, low ion extraction, and excellent molding or forming properties. Another object of the invention is to provide a fuel cell separator made from the same fuel cell separator composition. A further object is to provide a method of manufacturing such a fuel cell separator. A still further object is to provide a solid polymer fuel cell which has been assembled using such fuel cell separators as some or all of the separators therein.

We have discovered that fuel cell separator compositions wherein a mixture of a thermoset resin with a polyoxazine compound having a plurality of oxazine rings is employed as the binder for an electrically conductive carbonaceous powder can be molded or formed into fuel cell separators which have improved high-temperature durability, unlike the prior art wherein use of a binder composed of a thermoplastic or thermoset resin alone results in an inadequate high-temperature durability, and which are also endowed with better mechanical strength, chemical resistance, gas barrier properties and water resistance, lower ion extraction, better dimensional stability, and little or no need for degassing during molding or forming.

We have also found that solid polymer fuel cells assembled using such separators of excellent electrical conductivity, mechanical strength, chemical resistance, gas impermeability, low ion extraction, and molding or forming properties as some or all of the separators within the fuel cell undergo minimal decline in energy output and have a high operating efficiency, even when the separator has high gas barrier properties and the fuel cell is continuously operated for a long period of time. Hence, such fuel cells are well suited for use as mobile electrical power supplies for such applications as conventional automobiles, hybrid cars and small boats.

Accordingly, in a first aspect, the invention provides a fuel cell separator composition which includes an electrically conductive carbonaceous powder and a binder, wherein the binder is a mixture of a thermoset resin with a polyoxazine compound having a plurality of oxazine rings. The composition typically contains 100 parts by weight of the thermoset resin and 5 to 200 parts by weight of the polyoxazine compound. Preferably, the composition includes 100 to 6,000 parts by weight of the conductive carbonaceous powder per 100 parts by weight of the thermoset resin, and the conductive carbonaceous powder has an average particle size of 10 nm to 500 μm. It is advantageous for the composition to include also up to 500 parts by weight of a fibrous base per 100 parts by weight of the thermoset resin.

In a second aspect, the invention provides a fuel cell separator made by imparting to a fuel cell separator composition according to the above-described first aspect of the invention a separator shape having gas supplying and removing channels oh one or both sides thereof. The separator, when a 3.5 g specimen is cut therefrom, placed in 305 ml of deionized water and heated at 90° C. for 500 hours, imparts to the water an electrical conductivity of not more than 20 μS/cm. It is preferable for the fuel cell separator to have a resistivity, as measured according to JIS H0602, of at most 50 mΩ·cm and a gas transmission rate, as measured by method B of JIS K7126, of at most 50 ml/m²·day·atm.

In a third aspect, the invention provides a method of manufacturing fuel cell separators, which method includes the steps of preparing a fuel cell separator composition comprising an electrically conductive carbonaceous powder and a binder which is a mixture of a thermoset resin with a polyoxazine compound, then shaping the composition into a fuel cell separator having gas supplying and removing channels on one or both sides thereof. The composition is prepared by the admixture of 100 parts by weight of the thermoset resin, 5 to 200 parts by weight of the polyoxazine compound, 100 to 6,000 parts by weight of the conductive carbonaceous powder, and 0 to 500 parts by weight of a fibrous base.

In a fourth aspect, the invention provides a solid polymer fuel cell made up of a plurality of stacked unit cells, each unit cell being composed of a solid polymer electrolyte membrane, a pair of electrodes disposed on either side of the polymer electrolyte membrane, and a pair of separators disposed on either side of the pair of electrodes such as to form gas supplying and removing channels. At least some of the separators within the fuel cell are fuel cell separators according to the above-described second aspect of the invention. Preferably, the solid polymer fuel cell has an initial voltage $V_1$ and a voltage $V_2$ after 200 to 500 hours of continuous operation, such that $(V_2/V_1) \times 100$ is at least 80%.

BRIEF DESCRIPTION OF THE DRAWINGS

The objects, features and advantages of the invention will become more apparent from the following detailed description, taken in conjunction with the accompanying drawings.

FIG. 2 shows perspective views of fuel cell separators according to different embodiments of the invention.

DETAILED DESCRIPTION OF THE INVENTION

Figure 1:
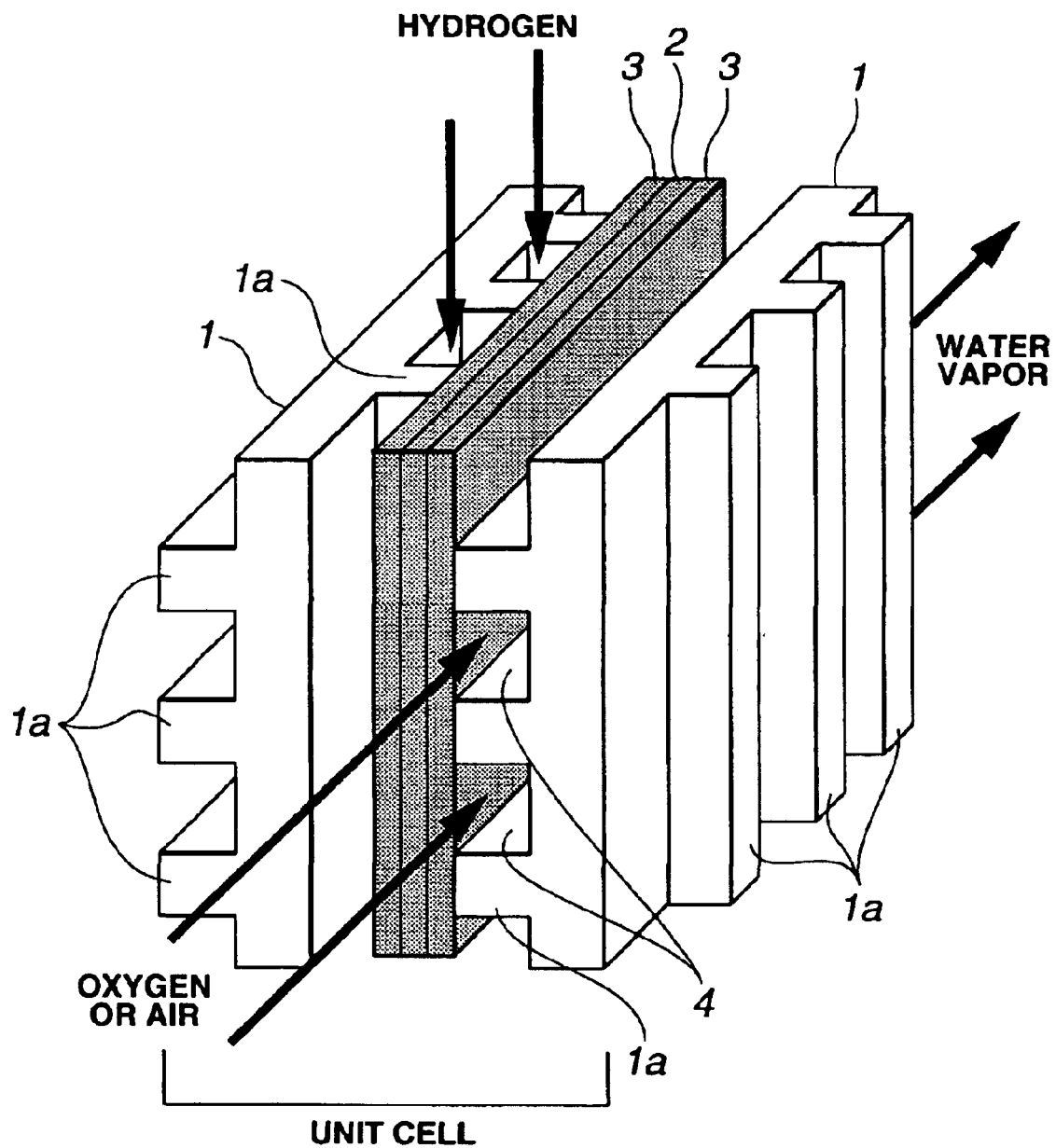
FIG. 1 is a perspective view showing the unit cell construction in a typical fuel cell.

The fuel cell separator composition of the invention is composed primarily of (A) a binder and (B) an electrically conductive carbonaceous powder. The binder (A) is a mixture of (A-1) a thermoset resin and (A-2) a polyoxazine compound having a plurality of oxazine rings.

Illustrative, non-limiting examples of the thermoset resin (A-1) include phenolic resins (e.g., resoles, novolaks), furan resins (e.g., furfuryl alcohol resins, furfuryl alcohol-furfural resins, furfuryl alcohol-phenol resins), polyimide resins, polycarbodiimide resins, polyacrylonitrile resins, pyrene-phenanthrene resins, polyvinyl chloride resins, epoxy resins, urea resins, diarylphthalate resins, unsaturated polyester resins and melamine resins. These may be used singly or as combination of two or more thereof. Phenolic resins, epoxy resins, or mixtures thereof are especially preferred.

The polyoxazine compound having a plurality of oxazine rings (A-2) is preferably a compound of general formula (1) below.

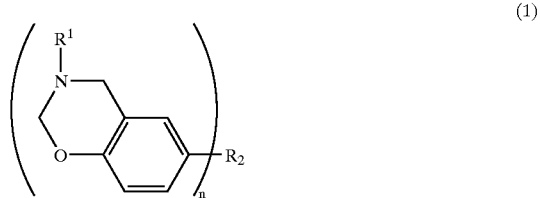

(1)

In formula (1), $R^1$ is an alkyl or aryl group, $R^2$ is an organic group of any one of formulas (2) to (19) below, and the letter n is an integer from 1 to 4.

(2)

(3)

(4)

(5)

(6)

(7)

(8)

(9)

-continued

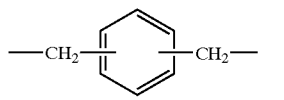 (10)

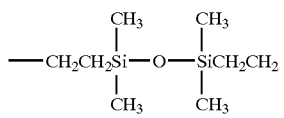 (11)

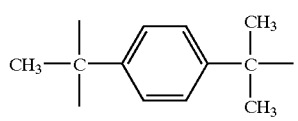 (12)

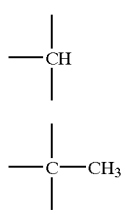

(13)

(14)

(15)

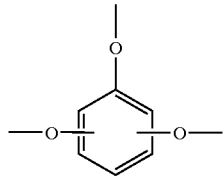 (16)

(17)

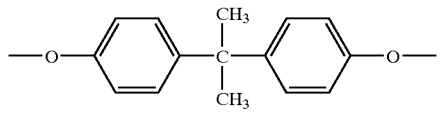 (18)

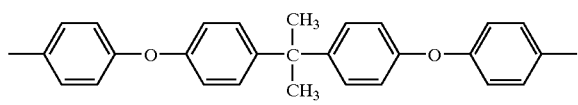 (19)

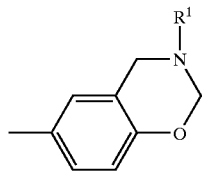

In formula (19), $R^1$ is as defined above.

More illustratively, in formula (1), $R^1$ is an alkyl group having 1 to 5 carbon atoms such as methyl or ethyl or an aryl group such as phenyl, tolyl or naphthyl, $R^2$ is an organic group of any one of formulas (2) to (19) below, and the letter n is an integer from 1 to 4.

Such polyoxazine compounds can be prepared by reacting one mole of a polyphenol compound with at least two moles of formalin per phenolic hydroxyl on the phenol compound and an aliphatic or aromatic primary amine (see JP-A 11-256009).

Examples of suitable polyphenol compounds include bis (4-hydroxyphenyl)methane (bisphenol F), 2,2-bis(4-hydroxyphenyl) propane (bisphenol A), bis(4-hydroxyphenyl)-sulfone (bisphenol S), 1,5-dihydroxynaphthalene and 4,4'-dihydroxybiphenyl.

Examples of suitable primary amines include aliphatic amines such as methylamine, ethylamine, butylamine, propylamine and cyclohexylamine, and aromatic amines such as aniline and toluidine.

The amount of polyoxazine (A-2) in the composition is preferably 5 to 200 parts by weight, preferably 10 to 150 parts by weight, more preferably 50 to 150 parts by weight, and most preferably 50 to 100 parts by weight, per 100 parts by weight of the thermoset resin. Too little polyoxazine may lower the strength and gas impermeability of the separator, whereas too much may impart to the molding material an excessive bond strength, which can result in such undesirable effects as poor mold release of the molded 30 article and fouling of the mold.

Illustrative examples of the electrically conductive carbonaceous powder (B) in the fuel cell separator composition of the invention include carbon black, acetylene black, Ketjenblack, flake graphite, lump graphite, artificial graphite, cashew graphite, amorphous carbon and expanded graphite. Any one or combinations of two or more thereof may be used. Of these, flake graphite and artificial graphite are especially preferred.

It is desirable for the conductive carbonaceous powder to have an average particle size within a range of preferably 10 nm to 500 μm, and especially 30 to 300 μm. If the carbonaceous powder has an average particle size larger than the above range, the powder may be subjected to size reduction and other suitable particle preparation operations so as to bring the average particle size into the foregoing range. Processes that may be used for this purpose include milling (such as with a mixer, jet mill, ball mill, pin mill, or by a freeze drying technique) and classification (e.g., with a vibrating sieve, Rotex screener, ultrasonic sieve, Micron classifier, or Spedic classifier).

It is advantageous for the conductive carbonaceous powder to have both an average particle size within the above-indicated range and also the following particle size distribution.

| less than 10 μm: | less than 1 wt % |
| at least 10 μm but less than 700 μm: | 50 to 99 wt % |
| at least 700 μm: | balance |

The amount of conductive carbonaceous powder (B) included in the fuel cell separator composition of the invention is preferably 100 to 6,000 parts by weight, more preferably 200 to 2,000 parts by weight, and most preferably 400 to 900 parts by weight, per 100 parts by weight of the. thermoset resin (A-1). Too much conductive carbonaceous powder may lower the gas barrier properties and strength of the separator. On the other hand, too little may lower the electrical conductivity.

In addition to components (A-1), (A-2) and (B) described above, the fuel cell separator composition may also include, if necessary, optional components for enhancing strength, release properties, hydrolysis resistance, electrical conductivity and other characteristics. Such optional components include fibrous bases, fillers, parting agents, metal powders, and anti-. hydrolysis additives.

Examples of suitable fibrous bases include inorganic fibers such as metal fibers (e.g., iron, copper, brass, bronze, aluminum), ceramic fibers, potassium titanate fibers, glass fibers, carbon fibers, gypsum fibers, rock wool, wollastonite, sepiolite, attapulgite, and synthetic mineral fibers; organic fibers such as aramid fibers, polyimide fibers, polyamide fibers, phenolic fibers, cellulose and acrylic fibers. Any one or combinations of two or more thereof may be used. The fibrous base is typically included in an amount of 0 to 500 parts by weight, preferably 10 to 500 parts by weight, and most preferably 10 to 300 parts by weight, per 100 parts by weight of the thermoset resin (A-1).

The filler may be a granular organic or inorganic filler. Illustrative examples include silicates such as wollastonite, sericite, mica, clay, bentdnite, asbestos, talc and alumina silicate; metal oxides such as alumina, silicon oxide, magnesium oxide, zirconium oxide and titanium oxide; carbonates such as calcium carbonate, magnesium carbonate and dolomite; sulfates such as calcium sulfate and barium sulfate; glass beads, boron nitride, silicon carbide and silica. It is also possible for the filler to be hollow or porous. To increase adhesion of the filler with the thermoset resin within the binder, prior to use the filler may be surface treated with a silane coupling agent, carbodiimide, or any of various suitable emulsions. The amount of filler added is generally from 0 to 500 parts by weight per 100 parts by weight of the thermoset resin (A-1).

Non-limiting examples of parting agents that may be used in the inventive composition include silicone-based parting agents, fluorocarbon-based parting agents, parting agents composed of the metal ester of a fatty acid, amide-based parting agents, and wax-based parting agents. Internal parting agents such as carnauba wax, stearic acid, zinc stearate or montanic acid are especially desirable. The amount of parting agent included is generally 0 to 30 parts by weight per 100 parts by weight of the thermoset. resin (A-1).

Metal powders that may be used in the inventive composition include stainless steel, gold, silver, copper, platinum, titanium, aluminum, and nickel powders. The metal powder has an average particle size of generally about 5 to 30 $\mu$m.

The fuel cell separator manufacturing method of the invention is a method capable of efficiently producing fuel cell separators having gas supplying and removing channels on one or both sides thereof by molding or forming, with minimal evolution of gases, a composition made up primarily of an electrically conductive carbonaceous powder (B) and a mixture of a thermoset resin (A-1) with a polyoxazine compound (A-2). The composition used for this purpose includes 5 to 200 parts by weight of the polyoxazine compound, 100 to 6,000 parts by weight of the conductive carbonaceous powder, and 0 to 500 parts by weight of a fibrous base per 100 parts by weight of the thermoset resin.

Prior to molding, it is advantageous to melt and blend together components (A-1), (A-2) and (B), as well as other optional components such as those described above which may be used as needed. Melting and blending may be carried out with a suitable apparatus such as a Banbury mixer, rubber roll mill, kneader, single-screw extruder or twin-screw extruder, and at a temperature of 150° C. to 450° C.

Prior to melting and blending, a mixing operation may be carried out using a known mixing means such as a stirring rod, ball mill, sample mixer, static mixer or ribbon blender to further enhance the dispersibility of the thermoset resin, the polyoxazine compound, the conductive carbonaceous powder and the filler.

The resulting fuel cell separator composition of the invention may be employed while still molten in the separator molding or forming step. Alternatively, if necessary, it may be formed into pellets and the pellets dried by a method known to the art, such as fluid bed drying, through-circulation drying with heated air, vacuum drying or vacuum/fluid bed drying.

The resulting mixture is typically molded with an injection molding machine equipped with a mold capable of molding the mixture into the shape of separators having gas supplying and removing channels on one or both sides thereof.

The fuel cell separator manufacturing method of the invention may be carried out using one or a combination of two or more shaping processes selected from among suitable processes known to the prior art, such as injection molding, compression molding, extrusion-compression molding, transfer molding, extrusion, isostatic pressing, belt pressing and roll forming.

The resulting fuel cell separator should preferably meet a level of ion extraction by water. Specifically, when a 3.5 g specimen is cut from the fuel cell separator, placed in 305 ml of deionized water, heated at 90° C., and the electrical conductivity of the water is measured over time, the water after 500 hours of heating has a conductivity of preferably at most 20 $\mu$S/cm, more preferably at most 15 $\mu$S/cm, even more preferably at most 10 $\mu$S/cm, and most preferably at most 5 $\mu$S/cm. Although the conductivity of the water is not subject to any particular lower limit, a conductivity of at least 2 $\mu$S/cm is preferred. If the conductivity of water measured in this way for a fuel cell separator is too large, fuel cells assembled using the separator tend to have a lower energy output and a poor operating efficiency, making it impossible to achieve the desired objects and advantages of the invention.

It is advantageous for fuel cell separators of the invention to have a resistivity of at most 50 m$\Omega$·cm, preferably at most 30 m$\Omega$·cm, and most preferably 2 to 30 m$\Omega$·cm, as determined by the four-probe method for measuring silicon single crystal and silicon wafer resistivity described in JIS H0602.

It is also advantageous for fuel cell separators of the invention to have the following characteristics, as measured in accordance with JIS K6911 ("Test Methods for Thermoset Plastics") using 100×10×4 mm test pieces fabricated from the fuel cell separator composition: a flexural strength of 20 to 100 MPa, and preferably 25 to 100 MPa; a flexural modulus of 3.1 to 100 GPa, and preferably 5 to 50 GPa; and a strain of 0.5 to 15 mm. and preferably 0.8 to 12 mm.

Moreover, it is desirable for the fuel cell separators of the invention to have a nitrogen transmission rate, as measured at 23° C. by method B ("Equal Pressure Method") of JIS K7126 ("Methods for Measuring Gas Transmission Rate through Plastic Film") using a 2 mm thick 100 mm diameter test piece fabricated from the fuel cell separator composition, of at most 50 ml/m$^2$·day·atm, preferably 30 ml/m$^2$·day·atm, and most preferably 20 ml/m$^2$·day·atm.

The solid polymer fuel cell of the invention is a plurality of stacked unit cells, each unit cell being composed of a solid polymer electrolyte membrane, a pair of electrodes disposed on either side of the polymer electrolyte membrane, and a pair of separators disposed on either side of the pair of electrodes such as to form gas supplying and removing channels. Some or all of the separators within the fuel cell are the above-described fuel cell separators of the invention.

Referring to FIG. 1, which illustrates the unit cell construction in a typical solid polymer fuel cell, the fuel cell of the invention is a module composed of a stack of at least several tens of unit cells. Each unit cell is composed of two separators 1, 1, each separator being in the form of a plate having a plurality of ribs 1a on either side thereof which define channels for supplying and removing gases such as hydrogen and oxygen. A solid polymer electrolyte membrane 2 and a pair of gas diffusing electrodes 3, 3 made of carbon paper are sandwiched between the separators 1, 1.

At least some of the separators in the inventive fuel cell are the above-described fuel cell separators of the invention which have a high modulus and are highly impervious to gases.

Specifically, it is advantageous for at least 50%, preferably 50 to 100%, more preferably 70 to 100%, and most preferably 80 to 100%, of all the separators in the fuel cell to be fuel cell separators according to the invention. If fuel cell separators according to the invention account for too low a proportion of all the separators in the fuel cell, the energy output by the fuel cell tends to decrease with continuous use over a long period of time, the separators become subject to cracking and breaking due to tightening with bolts and nuts during fuel cell assembly, and the gas sealing properties and impact resistance of the fuel cell have a tendency to decline, making it difficult to achieve the objects and advantages of the invention. Those separators used in the fuel cell which are not fuel cell separators according to the present invention may be separators of a type commonly employed in fuel cells.

The solid polymer electrolyte membrane may be of a type which is commonly used in solid polymer fuel cells. Illustrative examples include proton-conducting ion-exchange membranes formed from fluorocarbon resins, such as polytrifluorostyrene sulfonic acids or perfluorocarbon-sulfonic acids bearing the trade name designation Nafion. The surface of the electrolyte membrane is typically coated with a paste composed of a catalyst-supporting carbon powder dispersed in a perfluorocarbonsulfonic acid-containing lower fatty alcohol-water solution (Nafion 117 solution). The catalyst supported by the carbon powder is generally platinum or an alloy of platinum with another metal.

The pair of electrodes situated on either side of the solid polymer electrolyte membrane may be made of, for example, carbon paper, carbon felt, or carbon cloth woven from carbon fiber yarn.

The electrolyte membrane and electrodes are united by sandwiching the electrolyte membrane between the pair of electrodes and bonding under heat and pressure at 120 to 130° C. Alternatively, the electrolyte membrane and the pair of electrodes may be united by bonding with an adhesive.

The resulting electrode/electrolyte membrane/electrode laminate is then mounted between a pair of separators such as to form flow channels capable of supplying and removing the reactant and product gases, thereby forming a unit cell. Mounting may be carried out by, for example, applying an adhesive to the areas of the separators (i.e., the ribs) which come into contact with the electrodes.

By using the high-modulus, highly gas impervious fuel cell separators of the invention-as some (preferably at least 50%) or all of the separators in the solid polymer fuel cell of the invention, cracking and breaking does not arise in the separators due to tightening during assembly, and the fuel cell undergoes little decline in energy output and maintains a high operating efficiency during continuous, long-term operation. Moreover, the fuel cell has good gas sealing properties and excellent vibration and impact resistance. This combination of characteristics makes the solid polymer fuel cell of the invention well suited for use as a mobile power supply in such applications as conventional automobiles, hybrid cars and small boats.

It is advantageous for the solid polymer fuel cell of the invention to have an initial voltage $V_1$ and a voltage $V_2$ after 200 to 500 hours of continuous operation such that the ratio of $V_2$ to the initial voltage $V_1$, or $(V_2/V_1) \times 100$, is at least 80%, preferably at least 90%, and most preferably 95 to 100%. Such a fuel cell undergoes substantially no decline in energy output even when operated continuously for an extended period of time.

In addition to being used as a mobile power supply in such applications as conventional automobiles, hybrid cars and small boats, the solid polymer fuel cell of the invention can also be used in a broad range of other applications, including simple power supplies (such as for small-scale local power generation, household power generation and camp sites), and power supplies for satellites and space development.

EXAMPLES

The following examples and comparative examples are provided to illustrate the invention, and are not intended to limit the scope thereof.

Examples 1 to 19, Comparative Examples 1 to 5

Figure 2A:
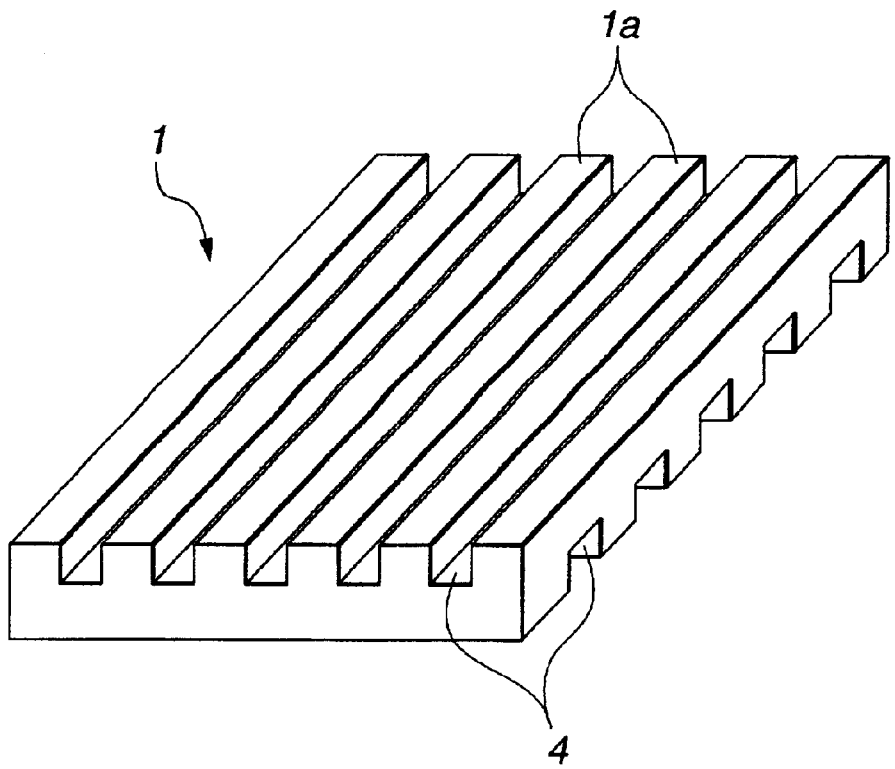
In FIG. 2A, gas supplying and removing channels are provided on both sides of the separator.
Figure 2B:
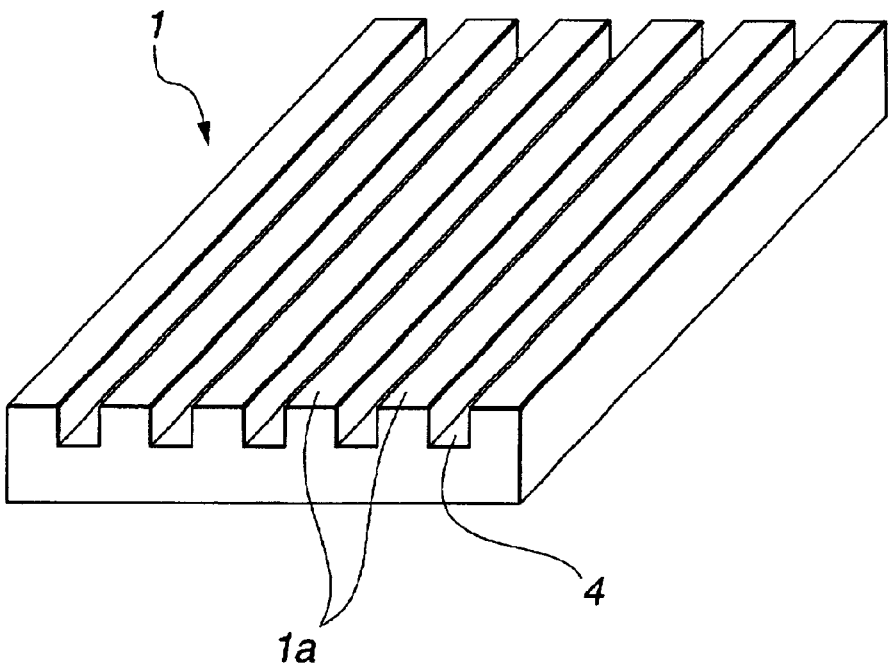
In FIG. 2B, gas supplying and removing channels are provided on only one side of the separator.

In each example, the various components were mixed in the proportions shown in Tables 1 to 3 to form a compound. The resulting compound was charged into a separator mold and compression-molded at 150° C. and 1.96 GPa for 5 minutes to produce a fuel cell separator. Each separator had a length of 100 mm, a width of 100 mm and a thickness of 2.0 mm, and had on one or both sides thereof gas supplying and removing channels like those shown in FIGS. 2A and 2B.

Note that amounts of the various components shown in Tables 1 to 3 are given in parts by weight. The thermoset resin used was a novolak-type phenolic resin, and the polyoxazine compound was B-a type benzoxazine made by Shikoku Chemicals Corporation.

The following methods were used to determine the properties of the fuel cell separators thus obtained. The results are shown in Tables 1 to 3.

Bending Tests:

Using an Instron 5544 testing machine and 100×10×4 mm specimens, the flexural strength and flexural modulus were measured in accordance with JIS K6911 at a support. interval of 80 mm and a test rate of 0.5 mm/min.

Resistivity:

The volume resistivity was measured by the four-probe method (JIS H0602) using a Resistivity Processor Σ-10 (by NPS Corporation) and a specimen having a diameter of 100 mm and a thickness of 2 mm.

Moldability:

The moldability was rated as "excellent", "good", "marginal" or "poor". A rating of "poor" means that the composition did not cure.

Gas Transmission Rate:

Measurement was carried out using a 2 mm thickness, 100 mm diameter specimen in accordance with Method B ("Isotactic Method") of JIS K7126.

Electrical Conductivity of Water after 500 Hours:

A 3.5 g specimen cut from the fuel cell separator was placed in 305 ml of deionized water, the specimen-containing water was heated to 90° C., and the electrical conductivity of the water over time was measured. The electrical conductivity of the water after 500 hours of heating is shown in Tables 1 to 3.

Voltage Drop Ratio:

Solid polymer fuel cells were assembled by a conventional method using the respective fuel cell separators obtained in Examples 1 to 19 and Comparative Examples 1 to 5. The initial voltage ($V_1$) of each polymer fuel cell was measured, following which the fuel cell was subjected to a 200-hour continuous power generation test. The fuel cell voltage was then measured again ($V_2$), based on which the voltage drop ratio $(V_2/V_1) \times 100$ was computed. It should be noted that a large voltage drop ratio (a value close to 100) indicates a small voltage drop. The results are shown in Tables 1 to 3.

TABLE 1

| Component (pbw) | Example |  |  |  |  |  |  |  |  |  |
|---|---|---|---|---|---|---|---|---|---|---|
|  | 1 | 2 | 3 | 4 | 5 | 6 | 7 | 8 | 9 | 10 |
| Thermoset resin | 100 | 100 | 100 | 100 | 100 | 100 | 100 | 100 | 100 | 100 |
| Polyoxazine compound | 10 | 50 | 100 | 150 | 200 | 10 | 200 | 100 | 100 | 100 |
| Flake graphite | 470 | 640 | 860 | 1,070 | 1,280 | 260 | 5,000 | 3,800 | 2,710 | 1,800 |
| Flexural strength (MPa) | 40 | 44 | 47 | 45 | 41 | 40 | 40 | 47 | 50 | 53 |
| Flexural modulus (GPa) | 37 | 37 | 38 | 37 | 38 | 38 | 38 | 40 | 38 | 35 |
| Resistivity (m$\Omega \cdot$ cm) | 30 | 23 | 20 | 21 | 30 | 30 | 10 | 6 | 8 | 9 |
| Moldability | good | excellent | excellent | excellent | good | good | good | excellent | excellent | excellent |
| Gas transmission rate (ml/m$^2 \cdot$ day $\cdot$ atm) | 20 | 6 | 5 | 5 | 6 | 10 | 10 | 28 | 24 | 16 |
| Conductivity of water after 500 hrs ($\mu$S/cm) | 2.0 | 0.8 | 0.7 | 0.8 | 2.0 | 5.0 | 2.5 | 2.5 | 2.1 | 1.8 |
| Voltage drop ratio (%) | 99 | 99 | 98 | 98 | 99 | 99 | 99 | 99 | 98 | 98 |

TABLE 2

| Component (pbw) | Example |  |  |  |  |  |  |  |  |
|---|---|---|---|---|---|---|---|---|---|
|  | 11 | 12 | 13 | 14 | 15 | 16 | 17 | 18 | 19 |
| Thermoset resin | 100 | 100 | 100 | 100 | 100 | 100 | 100 | 100 | 100 |
| Polyoxazine compound | 100 | 100 | 100 | 100 | 100 | 100 | 100 | 100 | 100 |
| Flake graphite | 1,340 | 1,133 | 710 | 600 | 860 | 860 | 860 | 860 | 860 |
| Carbon fibers | — | — | — | — | 32 | 53 | 106 | 160 | 212 |
| Flexural strength (Mpa) | 47 | 49 | 50 | 52 | 48 | 56 | 60 | 54 | 48 |
| Flexural modulus (Gpa) | 37 | 38 | 38 | 37 | 38.5 | 39 | 40 | 42 | 43 |
| Resistivity (m$\Omega \cdot$ cm) | 12 | 16 | 19 | 22 | 21 | 23 | 26 | 28 | 34 |
| Moldability | excellent | excellent | excellent | excellent | excellent | excellent | good | good | good |
| Gas transmission rate (ml/m$^2 \cdot$ day $\cdot$ atm) | 15 | 16 | 19 | 19 | 5 | 10 | 12 | 18 | 25 |
| Conductivity of water after 500 hrs ($\mu$S/cm) | 1.5 | 1.7 | 1.9 | 2.1 | 1.5 | 1.7 | 1.8 | 1.9 | 2.0 |
| Voltage drop ratio (%) | 99 | 98 | 97 | 96 | 99 | 99 | 98 | 95 | 90 |

TABLE 3

|  | Comparative Example |  |  |  |  |
|---|---|---|---|---|---|
|  | 1 | 2 | 3 | 4 | 5 |
| Thermoset resin | 100 | 100 | 100 | 100 | 100 |
| Polyoxazine compound | 5 | 500 | 100 | 100 | 100 |
| Flake graphite | 450 | 2,560 | 50 | 9,000 | 860 |
| Carbon fibers | — | — | — | — | 1,000 |
| Flexural strength (MPa) | 20 | 25 | 50 | 4 | 10 |
| Flexural modulus (GPa) | 37 | 37 | 42 | 10 | 10 |
| Resistivity (m$\Omega \cdot$ cm) | 30 | 40 | 1,000 | 50 | 100 |
| Moldability | poor | poor | good | poor | poor |
| Gas transmission rate (ml/m$^2 \cdot$ day $\cdot$ atm) | 1,000 | 1,200 | 10 | 10,000 | 20,000 |
| Conductivity of water after 500 hrs ($\mu$S/cm) | 40 | 30 | 2 | 20 | 50 |
| Voltage drop ratio (%) | 50 | 55 | 30 | 3 | 3 |

Therefore, as set forth in the claims and illustrated in the examples, the present invention enables the efficient mass production, without gas evolution during molding or forming, of fuel cell separators endowed with a high modulus, excellent release properties, dimensional precision and gas impermeability, and low ion extraction. Moreover, by using such fuel cell separators as some or all of the separators in a fuel cell, the invention also makes it possible to obtain high-performance solid polymer fuel cells which undergo little decline in energy output when operated continuously for a long period of time, are not prone to cracking or breaking during assembly, have good gas sealing properties, and are endowed with excellent vibration and impact resistance.

Japanese Patent Application No. 2001-057587 is incorporated herein by reference.

Although some preferred embodiments have been, described, many modifications and variations may be made thereto in light of the above teachings. It is therefore to be understood that the invention may be practiced otherwise than as specifically described without departing from the scope of the appended claims.

What is claimed is:

1. A fuel cell separator composition comprising an electrically conductive carbonaceous powder and a binder, the binder being a mixture of a thermoset resin with a polyoxazine compound having a plurality of oxazine rings.

2. The fuel cell separator composition of claim 1 which contains 5 to 200 parts by weight of the polyoxazine compound per 100 parts by weight of the thermoset resin.

3. The fuel cell separator composition of claim 1 which contains 100 to 6,000 parts by weight of the conductive carbonaceous powder per 100 parts by weight of the thermoset resin, the conductive carbonaceous powder having an average particle size of 10 nm to 500 $\mu$m.

4. The fuel cell separator composition of claim 1, further comprising up to 500 parts by weight of a fibrous base per 100 parts by weight of the thermoset resin.

5. A fuel cell separator made by imparting to the fuel cell separator composition of any one of claims 1 to 4 a separator shape having gas supplying and removing channels on one or both sides thereof, which separator, when a 3.5 g specimen is cut therefrom, placed in 305 ml of deionized water and heated at 90° C. for 500 hours, imparts to the water an electrical conductivity of not more than 20 $\mu$S/cm.

6. The fuel cell separator of claim 5 which has a resistivity, as measured according to JIS H0602, of at most 50 m$\Omega$·cm and a gas transmission rate, as measured by method B of JIS K7126, of at most 50 ml/m$^2$·day·atm.

7. A method of manufacturing fuel cell separators, comprising the steps of:

preparing a fuel cell separator composition comprising an electrically conductive carbonaceous powder and a binder which is a mixture of a thermoset resin with a polyoxazine compound, and shaping the composition into a fuel cell separator having gas supplying and removing channels on one or both sides thereof;

wherein the composition is prepared by the admixture of 100 parts by weight of the thermoset resin, 5 to 200 parts by weight of the polyoxazine compound, 100 to 6,000 parts by weight of the conductive carbonaceous powder, and 0 to 500 parts by weight of a fibrous base.

8. A solid polymer fuel cell comprising a plurality of stacked unit cells, each unit cell being comprised of a solid polymer electrolyte membrane, a pair of electrodes disposed on either side of the polymer electrolyte membrane, and a pair of separators disposed on either side of the pair of electrodes such as to form gas supplying and removing channels; wherein at least some of the separators within the fuel cell are fuel cell separators according to claim 5 or 6.

9. The solid polymer fuel cell of claim 8 which has an initial voltage $V_1$ and a voltage $V_2$ after 200 to 500 hours of continuous operation, such that $(V_2/V_1) \times 100$ is at least 80%.

* * * * *